US007552332B2

(12) United States Patent
Singh et al.

(10) Patent No.: US 7,552,332 B2
(45) Date of Patent: Jun. 23, 2009

(54) JAVA BASED ELECTRONIC SIGNATURE CAPTURE METHOD, DEVICE AND SYSTEM

(75) Inventors: Prithipal Singh, Karnataka (IN); Sunil Lal, Karnataka (IN); Srinivasan Subramanian, Bangalore (IN)

(73) Assignee: SAP AG, Walldorf (DE)

( * ) Notice: Subject to any disclaimer, the term of this patent is extended or adjusted under 35 U.S.C. 154(b) by 1035 days.

(21) Appl. No.: 10/689,816

(22) Filed: Oct. 20, 2003

(65) Prior Publication Data
US 2005/0086483 A1 Apr. 21, 2005

(51) Int. Cl.
H04L 9/00 (2006.01)
H04K 1/00 (2006.01)
G06K 9/00 (2006.01)
H04L 9/32 (2006.01)

(52) U.S. Cl. .................. 713/170; 713/176; 713/181; 713/182; 726/2; 380/269; 382/115; 382/119; 705/64; 705/67; 705/75

(58) Field of Classification Search .................. 713/170
See application file for complete search history.

(56) References Cited

U.S. PATENT DOCUMENTS

| 6,285,916 | B1 * | 9/2001 | Kadaba et al. | 700/222 |
|---|---|---|---|---|
| 6,904,524 | B1 * | 6/2005 | Jaeger et al. | 713/176 |
| 6,938,051 | B1 * | 8/2005 | Burger et al. | 707/104.1 |
| 2002/0042885 | A1 * | 4/2002 | Eskandarian | 713/201 |
| 2002/0150241 | A1 * | 10/2002 | Scheidt et al. | 380/44 |
| 2004/0083371 | A1 * | 4/2004 | Algazi et al. | 713/186 |

FOREIGN PATENT DOCUMENTS

WO  WO 2004042523 A2 *  5/2004

OTHER PUBLICATIONS

Schneier, Bruce, Applied Cryptography, 1996, John Wiley & Sons, Inc., second edition, pp. 1, 2 and 440.*
Herbst et al, On an automated signature verification system, 1998, IEEE, pp. 600-604.*
Anonymous, FedEx Ground Receives Wireless Industry Award for New System that Caputers Digital Signatures at Package Delivery, 2001, Business Wire, p. 1.*

(Continued)

*Primary Examiner*—Ayaz R Sheikh
*Assistant Examiner*—Aravind K Moorthy
(74) *Attorney, Agent, or Firm*—Kenyon & Kenyon LLP (57) ABSTRACT

A method and system for capturing an electronic signature of a user in a Java-based environment on a personal digital assistant. A user is prompted by an applet operating on the personal digital assistant, handling a canvas by the applet, and capturing an instance of the electronic signature on the canvas. The canvas encodes the instance of the electronic signature in a file and transfers the file by the canvas to the applet. A personal digital assistant may include a screen sensitive to pressure for capturing a signature and an application adapted to capture and attach the signature to a business object. The application may also include an applet adapted to prompt a user and adapted to handle a canvas. The canvas is adapted to capture an instance of the electronic signature and encode the instance in a file. The file is transferred by the canvas to the applet.

21 Claims, 7 Drawing Sheets

OTHER PUBLICATIONS

Carolyn Ong, Bluetooth pen delivers speed, effectiveness to courier FedEx Handwriting recognition joins armoury of wireless technologies aimed at cutting package delivery times, 2003, South China Morning Post, p. 3.*

"High Level SP (Solution Production) Business Case 'Signature Capture'", mySAP Inventory Management Business Case, 2003 SAP AG, Version 0.1.

* cited by examiner

JAVA BASED ELECTRONIC SIGNATURE CAPTURE METHOD, DEVICE AND SYSTEM

FIELD OF THE INVENTION

The present invention relates to electronic signatures. More particularly, the present invention relates to a method of capturing, storing and authenticating electronic signatures in a java based application running in a personal digital assistant.

BACKGROUND INFORMATION

Java is an object oriented programming language. Java is implemented by applets. Graphic interchange format (.gif or GIF) files are used to store electronic images. MD5 is an encryption algorithm.

In the pharmaceutical/healthcare industry, a certified physician may need to acknowledge the delivery of medical samples from a salesperson. This acknowledgement may need to be in an electronic format, and may need to be verified, testifiable and secure. Since the salesperson may work with a Personal Digital Assistant (PDA) during sales calls, the acknowledgement may be the signature of the physician, which should be captured in the PDA. The signature may need to be stored in a data base which may be acceptable under various legal jurisdictions. The signature may also need to be attached to a business transaction, to thereby complete the pharmaceutical industry sales business cycle.

There thus is a need for a simple, java based signature capture application which can run in various operating systems in different PDAs available in the market.

SUMMARY

According to an exemplary embodiment of the present invention, a method is provided for a component that is fully java based, simple to use, and which may be integrated into other java based applications. The component can support most PDAs available in the market.

A java based electronic software component according to an exemplary embodiment of the present invention may enable a signature to be attached to any business transaction in an electronic format and stored in a PDA as well as stored in a customer relationship management (CRM) system. The signature data may be stored in a certified system to satisfy legal requirements. The software may run in a java virtual machine (JVM). Due to the multi-platform feature of java, the signature capture may also run on multiple platforms. The component may have a java based applet and a canvas which run in a JVM in the PDA. The applet is a java component which may be embedded in any internet browser which supports applets. The user events may be captured in the applet and may be passed to the underlying canvas for processing.

An instance may be defined in software terminology as an individual object of a certain class. While a class is just the type definition, an actual usage of a class may be called an instance. Each instance of a class may have different values, for its instance variables, i.e., the state. The instance of canvas may be responsible for the processing of the data transferred via the applet. The canvas may store the data and hand over the data to the applet, which in turn may save it as a .gif file. GIF is a standard for defining generalized color raster images. This format may allow high-quality, high-resolution graphics to be displayed on a variety of graphics hardware and may operate as an exchange and display mechanism for graphics images. The image format may support current and future image technology. The applet may be assisted by the underlying layer (e.g., a signature processing module) in converting this pixel image into a .gif format. The .gif file format is easy to transfer by wire and may occupy less memory space due to a compression algorithm.

A method for capturing an electronic signature of a user in a java based environment on a personal digital assistant is provided. The method includes prompting the user by an applet operating on the personal digital assistant, handling a canvas by the applet, and capturing an instance of the electronic signature on the canvas. The method further includes encoding by the canvas the instance of the electronic signature in a file and transferring the file by the canvas to the applet.

A personal digital assistant is provided which includes a screen sensitive to pressure for capturing a signature and an application adapted to capture the signature and attach the signature to a business object. In the personal digital assistant, the application further includes an applet adapted to prompt a user and adapted to handle a canvas. The canvas is adapted to capture an instance of the electronic signature and encode the instance in a file. The file is transferred by the canvas to the applet.

A computer readable medium is provided which includes a method for capturing an electronic signature of a user in a java based environment on a personal digital assistant.

DETAILED DESCRIPTION

According to an exemplary embodiment of the present invention, a method of capturing, storing and authenticating electronic signatures in a java based application running in a PDA is provided.

The proposed signature capture process may be available as a component to mobile applications in many different areas. It may be applied to many industries, including claims adjustment in the insurance industry, verification of order delivery in both the sales and service sectors, and sample management in the pharmaceutical industry.

Figure 1:
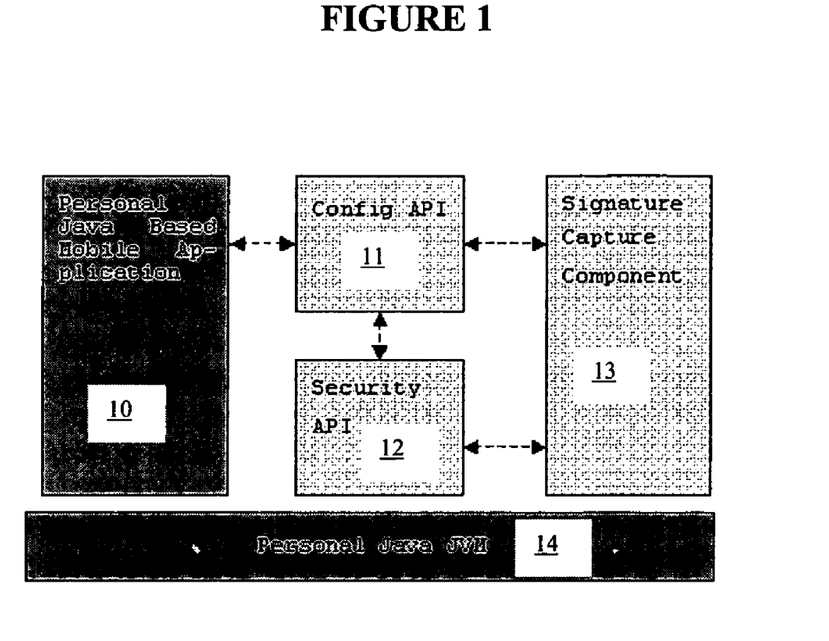
FIG. 1 shows a component layout of an exemplary embodiment of the present invention.

FIG. 1 shows an overall component layout of an exemplary embodiment of the present invention. Personal mobile application 10 may operate on a personal digital assistant and may communicate with config API 11. Config API 11 may communicate with security API 12 and with signature capture component 13. All of personal mobile application 10, config API 11, security API 12, and signature capture component 13 may operate in personal java JVM 14. Config API 11 may be an external interface to application integration developers. Developers may use the APIs to facilitate the application to set a user name (one who uses this application), to set a data directory for saving the signature file, to set the language of the captions of the buttons used in the signature capture application, and/or to check if a signature file exists or not.

Figure 2:
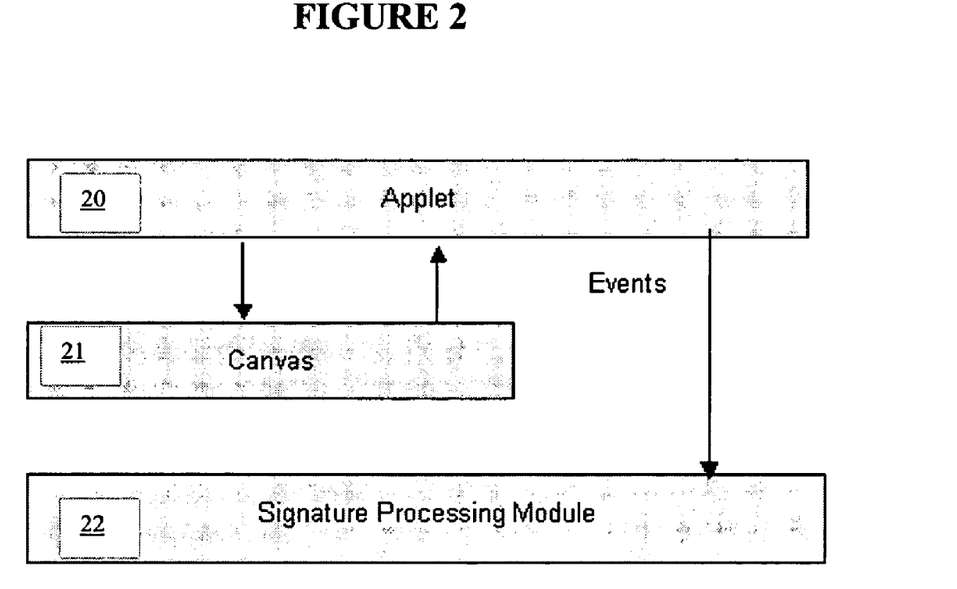
FIG. 2 shows an event handling diagram using a component of an exemplary embodiment of the present invention.

FIG. 2 shows an event handling using a component of an exemplary embodiment of the present invention. Applet 20 may prompt a user to present a signature. The signature may be presented to canvas 21, which may be controlled by applet 20. Canvas 21 may store and process the signature, and may encode the signature. Canvas 21 may communicate the signature to applet 20, which may pass the record of the event, including the signature and any other related data, including the attached business object, to signature processing module 22. Canvas 21 may be a component that represents a blank rectangular area of the screen onto which the application can draw or from which the application can trap input events from the user.

An application must subclass the java Canvas class in order to get useful functionality such as creating a custom component. The paint method is overridden in order to perform custom graphics on the canvas. The Signature Capture canvas has an overridden paint java function which draws the image within the size defined by the canvas itself. The canvas, during the startup, may set the following parameters: defines the background color of the canvas; defines the height and width of the drawable area; selects the color of the raster (pen) to draw; and fills the canvas with a predefined background. The erase java function may be responsible to clear the image once drawn in the canvas.

Figure 3:
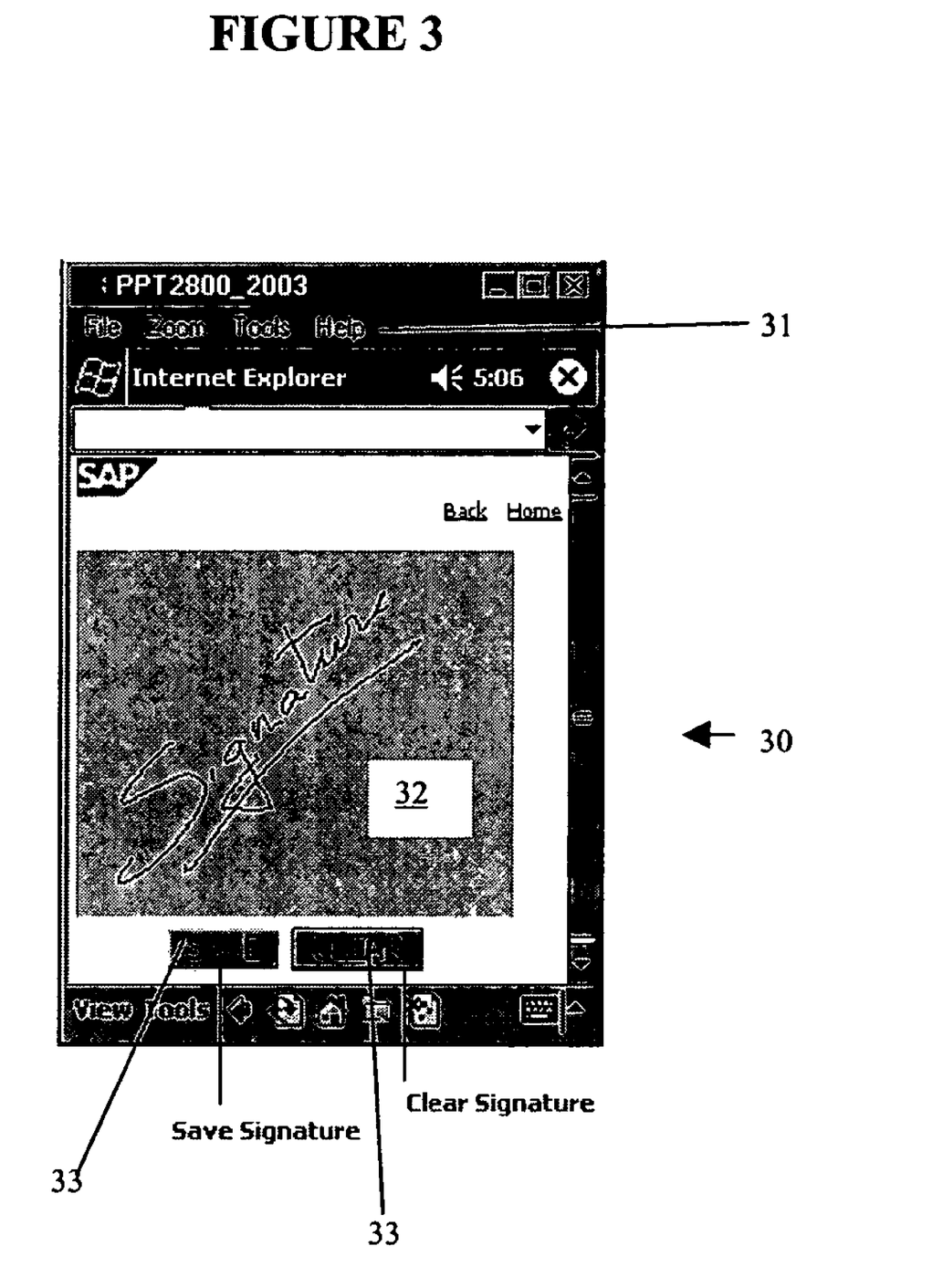
FIG. 3 shows a user interface of an exemplary embodiment as seen in a PDA running a signature capture application.

FIG. 3 shows an exemplary user interface as seen in PDA 30 running a mobile pharmaceutical industry application. The mobile application may include taskbar 31 and signature capture zone 32. Also included in the mobile application may be signature commands 33, for instance a save signature command and a clear signature command.

Figure 4:
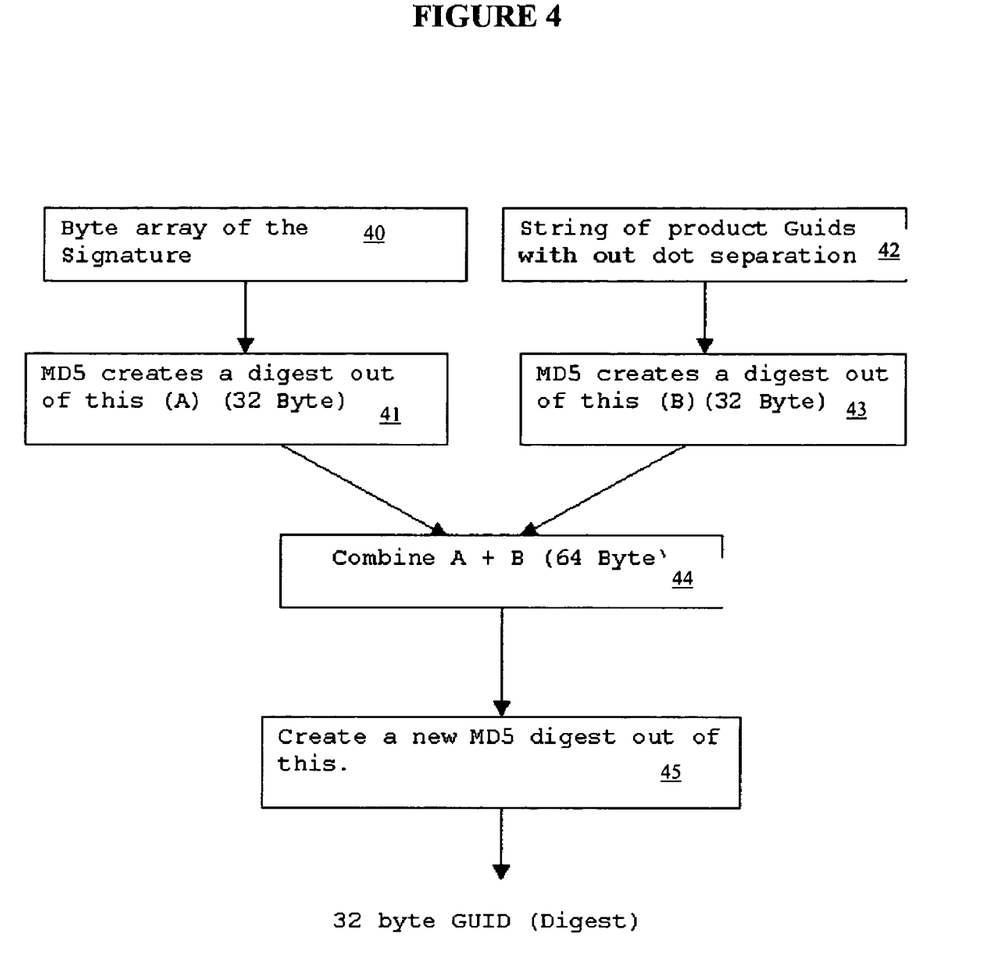
FIG. 4 shows a flowchart of a message digest creation algorithm according to an exemplary method of the present invention.

FIG. 4 shows a message digest creation algorithm in the form of a flowchart. In action 40, a byte array of the signature may be created. From action 40, the flow proceeds to action 41, where MD5 may create a digest out of the byte array created in action 40. Simultaneously or consecutively with actions 40 and 41, action 42 may create a string of product GUIDS (Goals centered design; User interface design; Implementation design interface; Data design; Strategies for construction (object oriented programming methodology)) without dot separation. From action 42, the flow may proceed to action 43, where MD5 may create a digest out of the byte array created in action 42. The flow from actions 41 and 43 may proceed to action 44, in which the digests from actions 41 and 43 may be combined. This combination may involve the addition of two 32 byte digests into a 64 byte digest. From action 44, the flow proceeds to action 45, which may create a new MD5 digest from the 64 byte digest. Action 45 may output a 32 byte GUID (Globally Unique Identifier).

The system according to an exemplary embodiment of the present invention may utilize one or more of the following algorithms. A security algorithm may include MD5 as an external algorithm, which may be used to get the digest of any file. A digest creation algorithm may include the digest of the signature and may be calculated both in a client (for instance, a PDA) and a server.

The product GUIDs may be taken as unique identifiers for pharmaceutical industry applications. Other application developers may supply any other unique identifier as a parameter.

Figure 5:
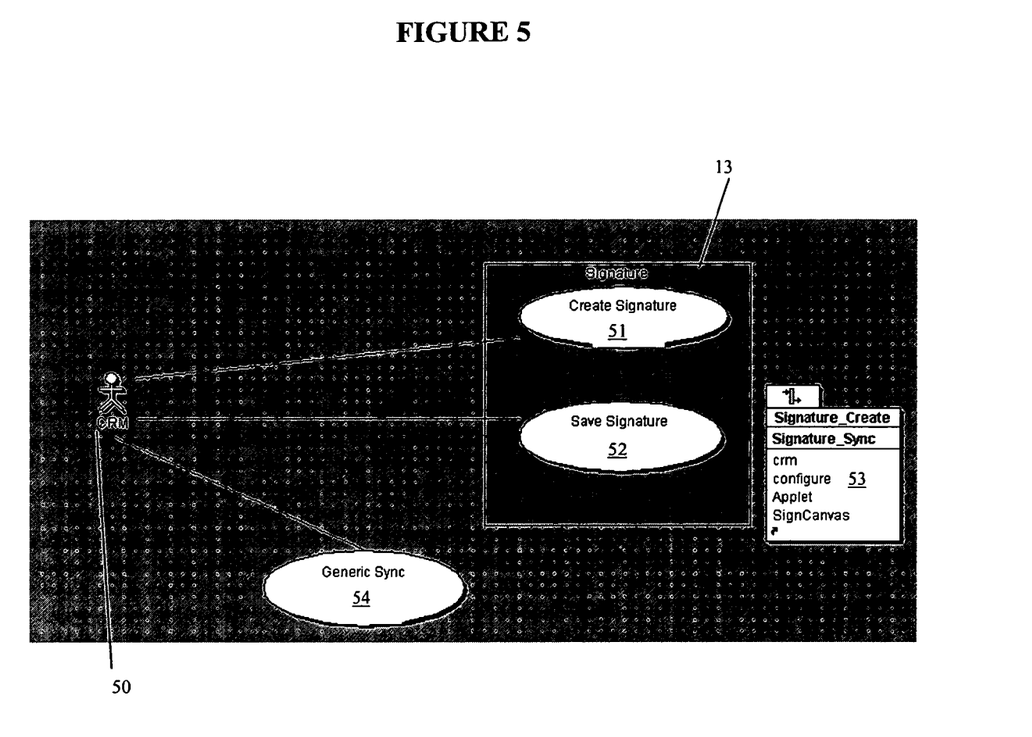
FIG. 5 illustrates schematically the relationship between an exemplary embodiment of the java based signature capture component and a customer relations management application.

FIG. 5 illustrates schematically the relationship between an exemplary embodiment of java based signature capture component 13 and customer relations management application 50. Java based signature capture component 13 may include create signature function 51 and save signature function 52. Relations table 53 shows the relationship between the various functions of java based signature capture component 13 and illustrates the unified modelling language based package hierarchy. Relations table 53 shows the separation by components of the signature create function and its synchronization using applet, canvas, configuration API and the system running customer relations management application 50. Java based signature capture component 13 communciates with customer relations management application 50, which may be installed on a central server. Therefore the communication link between java based signature capture component 13 and customer relations management application 50 may be a temporary dial-up connection, a temporary hardwire connection, a permanent connection, and/or a wireless connection. Customer relations management application 50 may access generic sync function 54, which may allow synchronization of signature files with other personal digital assistants running other java based signature capture applications, or various other applications including signature data.

Figure 6:
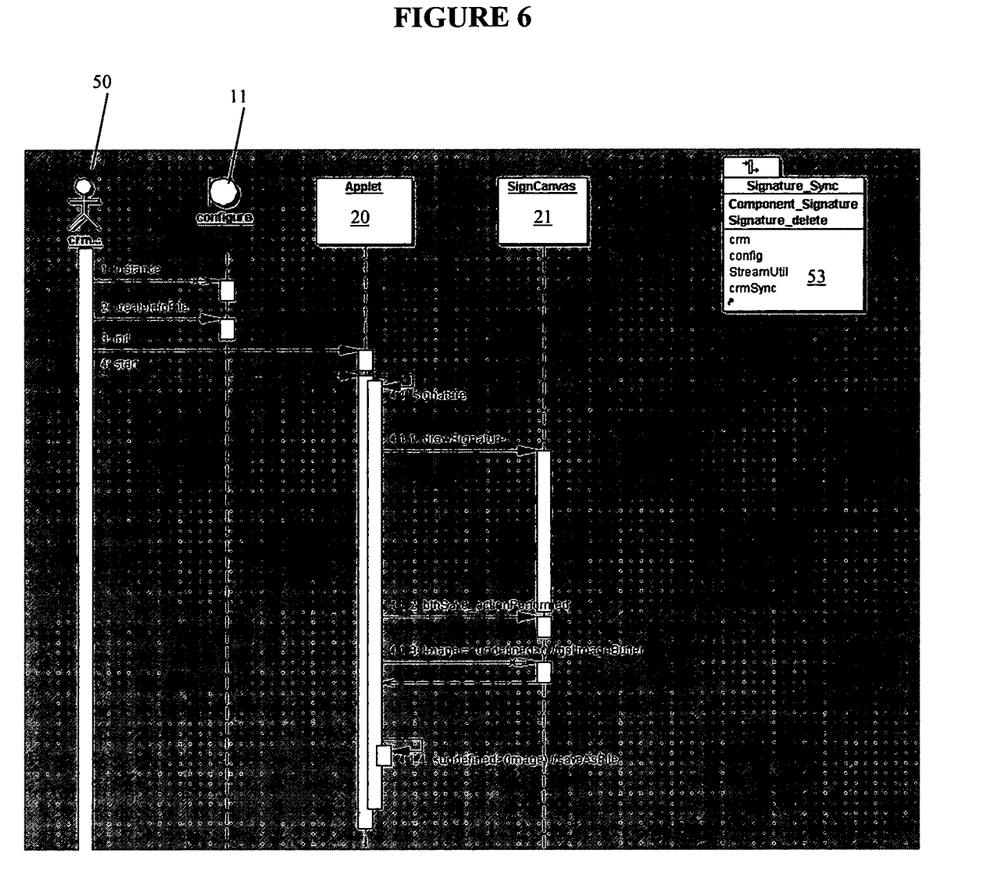
FIG. 6 illustrates schematically the relationship between an exemplary embodiment of the java based signature capture component and a customer relations management application.

FIG. 6 illustrates schematically the relationship between an exemplary embodiment of java based signature capture component 13 and customer relations management application 50 and illustrates the Signature Create functional activity in a use case model. Customer relations management application 50 may communicate with config API 11 and applet 20. Applet 20 may communicate with canvas 21. Relations table 53 may illustrate the functions included in a signature synchronization function. Customer relations management application 50 may create a signature, save the signature, and/or synchronizes the data collected with the system running customer relations management application 50 (the CRM system).

Figure 7:
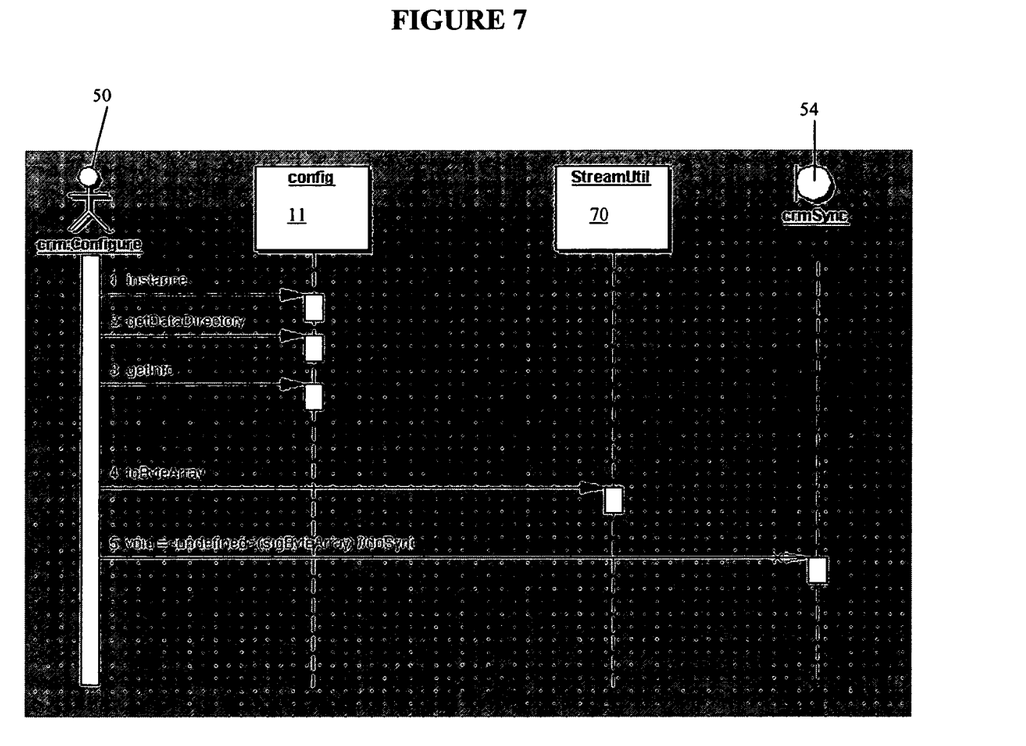
FIG. 7 illustrates schematically the relationship between an exemplary embodiment of the java based signature capture component and a customer relations management application.

FIG. 7 illustrates schematically the relationship between an exemplary embodiment of the java based signature capture component and customer relations management application 50. Customer relations management application 50 communicates with each of config API 11, generic sync function 54, and streamutil 70. Streamutil 70 may be a java specific class, which converts the signature data into the alpha-numeric characters (e.g., 0-F). Since a CRM system may have APIs that expect the signature data in alpha numeric form during synchronization, the Signature Capture client component may convert the signature capture data into alpha-numeric format.

Figure 8:
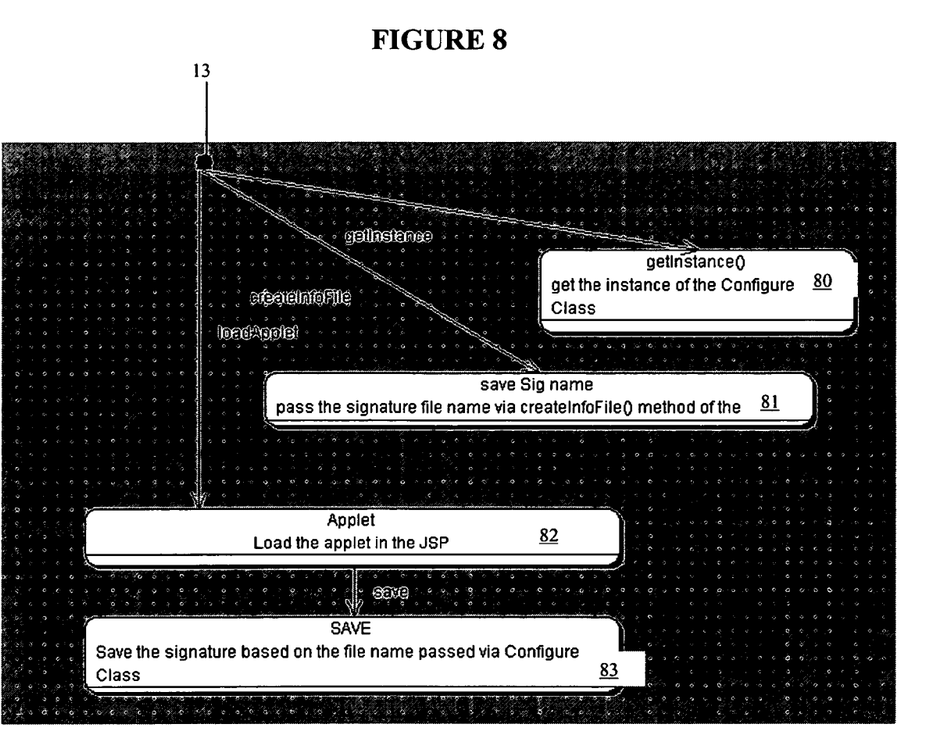
FIG. 8 illustrates an exemplary operation using the java based signature capture component according to an exemplary embodiment of the present invention.

FIG. 8 illustrates an exemplary operation using java based signature capture component 13 according to an exemplary embodiment of the present invention. Java based signature capture component 13 may access any of several functions, including getinstance 80, savesigname 81, and applet 82. Applet 82 may be loaded and may access save function 83. One click of the save button in applet 82 and the image captured on the canvas is saved as a .gif file and saved in the local directory, which is achieved by the function written in the canvas.

The signature capture scenario may include the following functionality to address the requirements of the pharmaceutical industry. A signature should not be lost or manipulated (even in the case of a power outage or breakage of the device). A signature may need to be firmly attached to a business object, i.e., a signature may need to be linked to their respective electronic records to ensure that the signatures cannot be excised, copied, or otherwise transferred to falsify an electronic record by ordinary means. The image of the signature may have to be stored for audit trail purposes. It should not be possible to duplicate the image, change the image or attach the image to another document. With the image, a timestamp, the name of the signer, and/or the purpose of the signature may have to be stored.

Audits may be performed on a random basis in order to check the signatures visually (for example: 3 initial signatures may be compared against the most recent 10 signatures). In case of a discrepancy between the signatures, certain activities may be triggered and documented. The system may allow for easy setup of a workflow. The sample order itself may be prevented from changing after it has been signed.

Records may be maintained for a minimum period, for example three years. There may be a requirement to validate the signature upon entry. Several mobile applications may utilize signature capture as a component. Some mobile applications may not be viable without signature capture as a component.

The system may store, process and retrieve the data appropriately in R/3, and may operate in accordance with applicable laws.

A range of electronic signature software solutions may utilize PKI (public key infrastructure), signature dynamics, and/or smart cards. Public key infrastructure may be a system of public key encryption using digital certificates from certificate authorities and other registration authorities that verify and authenticate the validity of each party involved in an electronic transaction. In response to increasing market demand, vendors may be focusing on selected broad verticals such as banking, financial sector, brokerage, and healthcare industries. There is demand for, and acceptance of, electronic signature functionality, which is evident from the key development projects being undertaken at some organizations.

Signature capture functionality may eliminate the need to maintain paper documents and therefore may reduce document costs associated with hand-written signatures. The documents, as well as the verifying signatures, may be maintained and retrieved in electronic form. Documents may be much more easily retrieved in an electronic form. Electronic signature capture may lessen the burden of the mobile user. A single device may perform the same tasks as a sheaf of paper while requiring less maintenance. Implementing this functionality may facilitate secure transaction completion and improve the management of the business process. Electronic signature capture may result in greater compliance with state and federal regulations and may increase cash flow by reducing float time.

There is growing demand for electronic signature software solution in the market. Incorporating electronic signature capturing functionality into existing mobile applications may add appeal to existing applications and form the basis for new applications. This functionality may extend applications dedicated to mobile asset management, customer relations management handheld sales/service, and direct store delivery. New application areas may include sales force automation in the pharmaceutical industry and/or mobilizing credit card payments.

Electronic signature capture functionality may enable matching of competitive products and provide customers with an end-to-end solution. Electronic signature capture functionality may be a feature of a Handheld Mobile Asset Management implementation.

Various laws and regulations pertaining to electronic signature have been enacted or introduced, but there is no universal standard at present. The risks associated with this functionality lie mainly in the legal requirements. The best way to address these risks may be to apply the most stringent requirements to the component so that it may be used in any situation.

Signature capture component is a purely java based solution for PDA based applications. This provides generic APIs (application programming interface) for cross application development. The component may be jdk1.1.8 compatible and may run in personal java jre (the java run-time environment, which may be a part of the java development kit used to run java programs). Also this component may be deployed in a Unix-Linux-based machine with little modification. This component may run on PocketPC, desktop windows PC, and/or a Unix platform. A minimum memory of 64 MB may be needed for good performance.

The process of capturing signatures is described in the following example. A doctor, on receiving a sample, signs on the PDA as an indicator of acceptance of the sample. The signature may be saved onto a data directory of a mobile engine as a .gif file in order to facilitate synchronization with the back end system at a later stage. The signature data may be sent from the client to the server as a byte stream array in a generic sync container. A digest of the signature may be made out of the signature .gif file. The server may retrieve the byte array from the container and may re-create the signature .gif file and may attach it to a business object. Also, the server may perform the MD5 algorithm in reverse and may check the validity of the signature.

The configure class may enable the external application to talk to the interface. Any external application may have to get the instance of the configuration and then work with this instance thereafter. Any data/message transfer between the application and the signature module may have to be done via this instance.

A system according to an exemplary embodiment of the present invention may include the following functionalities: Signature Create, Delete Signature, and Sync Signature. Signature Create may be used to create and store a signature. Delete Signature may be used to delete a signature. Sync Signature may be used to store a signature in a central server with other signatures from the same person, may include a verification step, and may also include, after verification, an adjustment of the acceptance parameters for signatures from that person.

Public APIs (application programming interface) for application developers may be based on the following considerations. The APIs in the configure package may be a set of public APIs to be used by the application developers. The configure class may allow the developer to supply the location of the folder that is desired to be saved in the .gif file in the PDA. The applet may be internationalized, meaning that the button name and the language may be changed using the JSP/HTML tag.

The implementation scenarios and steps may include the following. API calls in the Signature calling page. Call the createInfoFile( ) method of the Configure API class, and pass a unique value by which the signature component creates the .gif on saving the signature. API calls to generate Digest or Check-Sum. Call the getDigest( ) method of the DataDigest class by passing the name of the .gif (which will be taken by the API which is set in the step 1 on calling the getInfo( ) method), and a string of all the item names or id's based on the agreement with the server.

The getDigest( ) method may return the check-sum(Digest) that can be set using the generic Sync container of the ME. API may call to get Byte Array stream of the Signature. Call to ByteArray( ) method of the StreamUtil API class, and pass the instance of FileInputStream by passing the .gif file name as a parameter for the FileInputStream instance, the return value of the method is a string.

The dumsigBytes may be the signature in string that can be set using the generic Sync container of the ME. API may call to Delete Images. Call removeInfoFiles( ) method of the Configure class, by passing the same parameter, which is passed to create the image. This may delete the image of the user from the data folder of the Mobile Engine.

While the present invention has been described in connection with the foregoing representative embodiment, it should be readily apparent to those of ordinary skill in the art that the representative embodiment is exemplary in nature and is not to be construed as limiting the scope of protection for the invention as set forth in the appended claims.

What is claimed is:

1. A method for capturing an electronic signature of a user in a java based environment on a personal digital assistant (PDA) for verifying delivery of a package, comprising:
   capturing an instance of the electronic signature by a canvas application;
   encoding by the canvas the instance of the electronic signature in a file, wherein the canvas application has exclusive access to captured electronic signatures on the PDA;
   encoding an identification number of a second application loaded on the PDA for the delivery of the package to generate an encoded identifier;
   combining the encoded signature with the encoded identifier to generate a signature/identifier pair;
   encoding the signature/identifier pair;
   transferring the encoded signature/identifier pair to a remote CRM application; and
   responsive to receiving a verification from the remote CRM application, if the signature/identifier pair is verified then authorizing the delivery of the package, otherwise not authorizing the delivery of the package.

2. The method according to claim 1, further comprising:
   storing the encoded signature/identifier to a file;
   attaching a pointer to the file, the pointer pointing to a business object associated with the second application and the delivery of the package.

3. The method according to claim 2, further comprising communicating by the personal digital assistant the file and the business object to a server.

4. The method according to claim 3, further comprising encoding the file and the business object prior to communicating the file and the business object to the server.

5. The method according to claim 4, wherein the file and the business object are encoded using an MD5 algorithm.

6. The method according to claim 3, further comprising comparing the file to at least one stored file by the server for consistency.

7. The method according to claim 6, further comprising producing a rejection message if the server determines that the file and the at least one stored file are not consistent.

8. The method according to claim 6, further comprising producing an acceptance message if the server determines that the file and the at least one stored file are consistent.

9. The method according to claim 1, wherein the file is a .gif file.

10. The method according to claim 1, wherein the user is prompted to present the electronic signature in response to a delivery of a pharmaceutical, the electronic signature and identification of the second application verifying receipt of the pharmaceutical.

11. A personal digital assistant (PDA) for capturing an electronic signature of a user for verifying delivery of a package, comprising:
    a pressure sensitive screen; and
    a processing system adapted to;
    capture an instance of the electronic signature by a canvas application;
    encode by the canvas the instance of the electronic signature in a file, wherein the canvas application has exclusive access to captured electronic signatures on the PDA;
    encode an identification number of a second application loaded on the PDA for the delivery of the package to generate an encoded identifier;
    combine the encoded signature with the encoded identifier to generate a signature/identifier pair;
    transfer the encoded signature/identifier pair to a remote CRM application; and
    responsive to receipt of a verification from the remote CRM application, if the signature/identifier pair is verified then authorize the delivery of the package, otherwise not authorize the delivery of the package, wherein the processing system is operated in a java based environment.

12. The personal digital assistant according to claim 11, wherein a pointer is attached to the file, the pointer pointing to a business object associated with the signature.

13. The personal digital assistant according to claim 12, wherein the personal digital assistant communicates the file and the business object to a server.

14. The personal digital assistant according to claim 13, wherein the personal digital assistant encodes the file and the business object prior to communicating the file and the business object to the server.

15. The personal digital assistant according to claim 13, wherein the server compares the file to at least one stored file for consistency.

16. A computer readable medium embodying computer instructions that, when executed by a computer, perform a method for capturing an electronic signature of a user in a java based environment on a personal digital assistant (PDA) for verifying delivery of a package, the method comprising:
    capturing an instance of the electronic signature by a canvas application;
    encoding by the canvas the instance of the electronic signature in a file, wherein the canvas application has exclusive access to captured electronic signatures on the PDA;
    encoding an identification number of a second application loaded on the PDA for the delivery of the package to generate an encoded identifier;
    combining the encoded signature with the encoded identifier to generate a signature/identifier pair;
    encoding the signature/identifier pair;
    transferring the encoded signature/identifier pair to remote CRM application; and
    responsive to receiving a verification from the remote CRM application, if the signature/identifier pair is verified then authorizing the delivery of the package, otherwise not authorizing the delivery of the package.

17. The computer readable medium according to claim 16, wherein the method further comprises attaching a pointer to the file, the pointer pointing to a business object associated with the electronic signature.

18. The computer readable medium according to claim 17, wherein the method further comprises communicating by the personal digital assistant the file and the business object to a server.

19. The computer readable medium according to claim 18, wherein the method further comprises encoding the file and the business object prior to communicating the file and the business object to the server.

20. The computer readable medium according to claim 18, wherein the method further comprises comparing the file to at least one stored file by the server for consistency.

21. A network, comprising:
- a personal digital assistant (PDA) for capturing an electronic signature of a user for verifying delivery of a package adapted to;
- capture an instance of the electronic signature by a canvas application;
- encode by the canvas the instance of the electronic signature in a file, wherein the canvas application has exclusive access to captured electronic signatures on the PDA;
- encode an identification number of a second application loaded on the PDA for the delivery of the package to generate an encoded identifier;
- combine the encoded signature with the encoded identifier to generate a signature/identifier pair;
- encode the signature/identifier pair;
- transfer the encoded signature/identifier pair to a remote CRM application; and
- responsive to receipt of a verification from the remote CRM application, if the signature/identifier pair is verified then authorize the delivery of the package, otherwise not authorize the delivery of the package;
- a server adapted to receive the encoded signature/identifier pair from the PDA;
- wherein the server compares the encoded signature/identifier to a stored signature/identifier file and sends a verification to the PDA if the result of the comparison is determined to be a match.

* * * * *